March 3, 1970  W. S. GRUENDLER ET AL  3,498,548
FLUFF MILL
Filed June 28, 1967  4 Sheets-Sheet 1
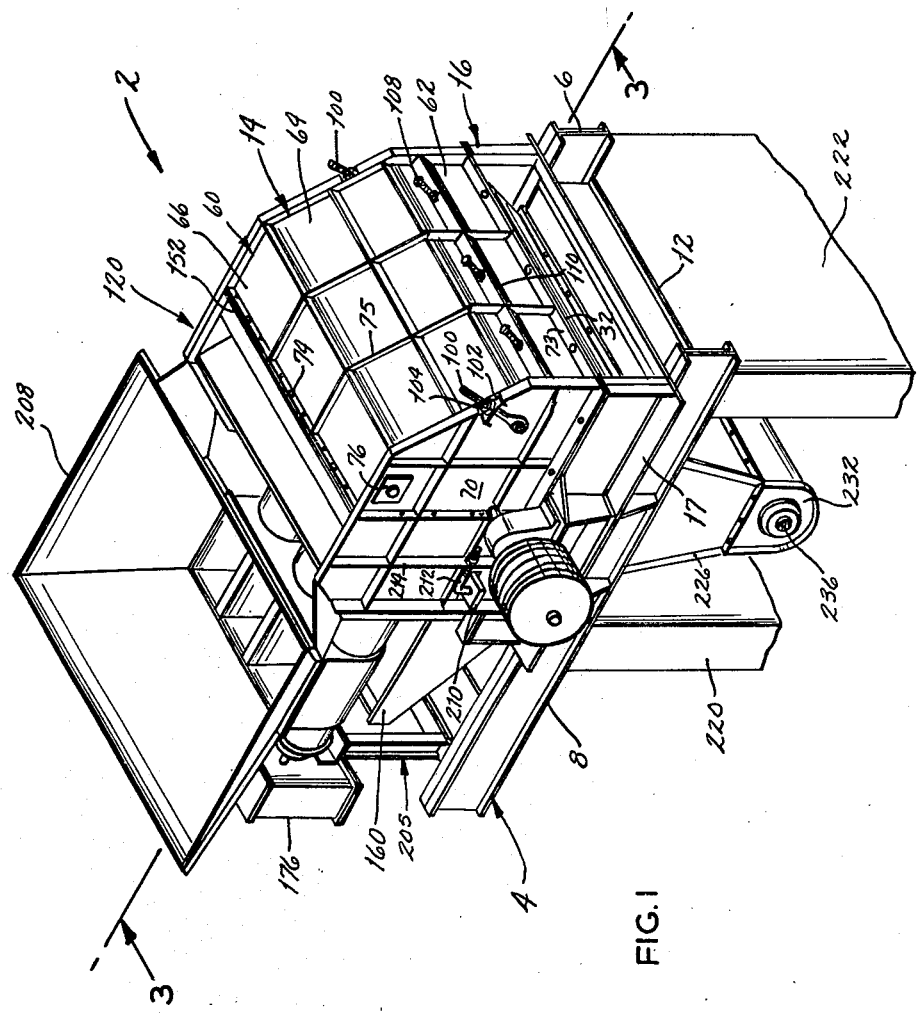
FIG.1
INVENTORS
WILLIAM S. GRUENDLER
ORLY BOB McCLURE
BY 
ATTORNEY INVENTORS
WILLIAM S. GRUENDLER
ORLY BOB McCLURE
BY John D. Pope
ATTORNEY

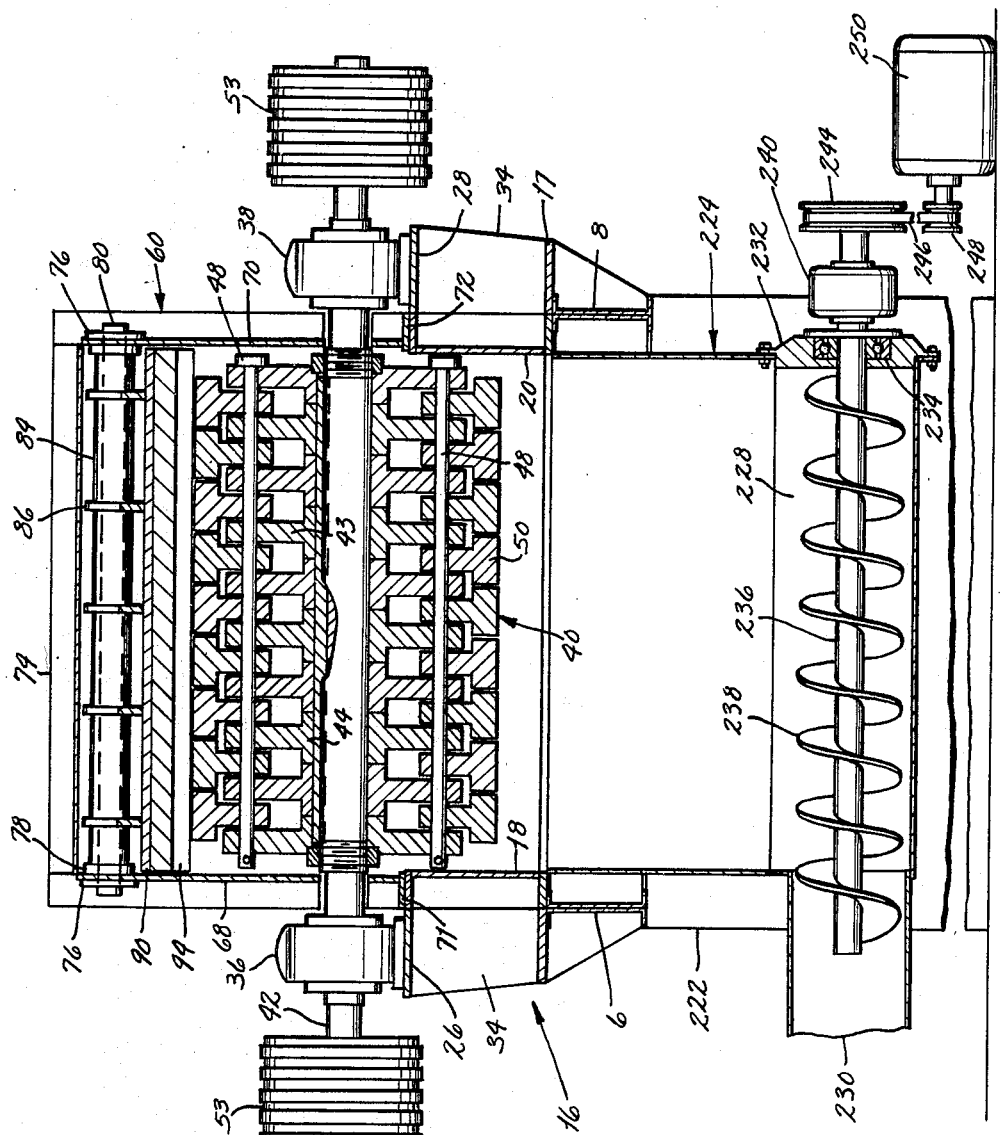

United States Patent Office 3,498,548
Patented Mar. 3, 1970

---

3,498,548
FLUFF MILL
William S. Gruendler, Richmond Heights, and Orly Bob McClure, Ladue, Mo. (both of 2915 N. Market, St. Louis, Mo. 63106)
Filed June 28, 1967, Ser. No. 649,586
Int. Cl. B02c 13/04, 23/02
U.S. Cl. 241—186                    14 Claims

ABSTRACT OF THE DISCLOSURE

A fluff mill of the up-running variety for reducing rock to a finely divided state. The fluff mill includes a cage with a rotor rotatably mounted in it, the rotor having hammers which pass in close proximity to canted breaker bars located above the rotor. The breaker bars are carried on a breaker bar assembly which is adjusable externally of the cage so that the distance between the hammers and breaker bars can be altered. Screw-type conveyors are provided for forcing rock feed material into the path of the hammers, and still another screw-type conveyor is provided for withdrawing the finely divided end product from the cage.

---

This invention relates in general to crushers and, more particularly, to an improved type of fluff mill for reducing a feed product to a large percentage of fines.

Limestone in pulverized or finely divided condition, commonly referred to as "agricultural dust," is frequently spread on crop fields to reduce the acidity of the soil so that fertilizers can achieve their maximum effectiveness as a growth stimulant. The more finely divided the limestone is, the more effective it will be when applied to soil. Indeed, many states prescribe specific standards for the size and the amount of fines within pulverized limestone marketed within their borders for agricultural purposes. Consequently, pulverized limestone having a high percentage of fines commands a premium price.

Heretofore, limestone has been reduced to a pulverized condition by conventional gravity fed hammer-mills employing grates or screens disposed beneath the rotor. In operation the hammers located on the rotor crush the limestone feed product against the grid-like grate and thereby reduce it to a pulverized state. The size of the end product is determined by the mesh size of the grate and to produce batches of varying particle sizes requires a change of grates which, in turn, generally demands a time-consuming disassembly of the hammermill. Moreover, the spacing between the grid-forming grate bars is limited to relatively large dimensions, for at a certain grid size the machine clogs when slightly oversized particles become lodged in those spaces. Consequently, numerous grit and pebble-sized particles pass through the relatively large spaces between various grate bars and are sold along with the fines. These not only detract from the effectiveness of the end product as a soil neutralizer, but also reduce the sale value of the end product. With the exception of the inlet space defined by the margins of the inlet, the rotor of a conventional hammermill is completely surrounded by a combination of breaker bars and grates, the latter being disposed beneath the rotor so that the pulverized material can filter through it. Such a construction results in a so-called congested mode of operation in which a load of feed material is carried around with the rotor until it is small enough to pass through the grate, reduction in size being achieved primarily by the hammers crushing the feed against the face of the grate. This mode of operation consumes considerable power and also causes the grate and hammers to wear rapidly which, in time, increases the clearance between the rotor and grate to such an extent that far too many large particles are obtained in the end product. When this occurs, a mechanic must completely disassemble the machine and replace the worn parts.

Furthermore, conventional hammermills are generally gravity fed and this feature in turn imposes a limitation on the peripheral speed of the hammers. Beyond a certain peripheral velocity which is generally 12,000 to 13,000 ft./min., it is impossible to introduce sufficient feed product into the mill to justify its operation. On the other hand, when slower machines are force fed, they often receive too much feed material and this causes the hammers to lay back and not crush the rock or other feed material against the grate.

Also limestone is quite porous and during the fall, winter, and spring months absorbs considerable moisture. This moisture remains in the feed material as it passes through the hammermill, and reacts with the fines to form a paste-like substance which within a short span of time clogs the grates or screens of conventional machines. Consequently, many quarry owners operate their hammermills only during the summer months when the moisture content of the feed material is at a minimum, notwithstanding the fact that the demand for crushed limestone as a soil neutralizer is greatest during the winter months.

Among the several objects of the present invention may be noted the provision of a fluff mill which reduces the feed product to a very high percentage of fines; the provision of a fluff mill of the type stated which consumes relatively little power; the provision of a fluff mill which is highly durable in operation and subject to little wear; the provision of a fluff mill wherein adjustment for wear and particle size can be made quickly without disassembling the entire machine; and the provision of a fluff mill in which the dust product is confined within the machine so as not to interfere with other operations or machinery. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a perspective view of a fluff mill constructed in accordance with and embodying the present invention;

Figure 2:
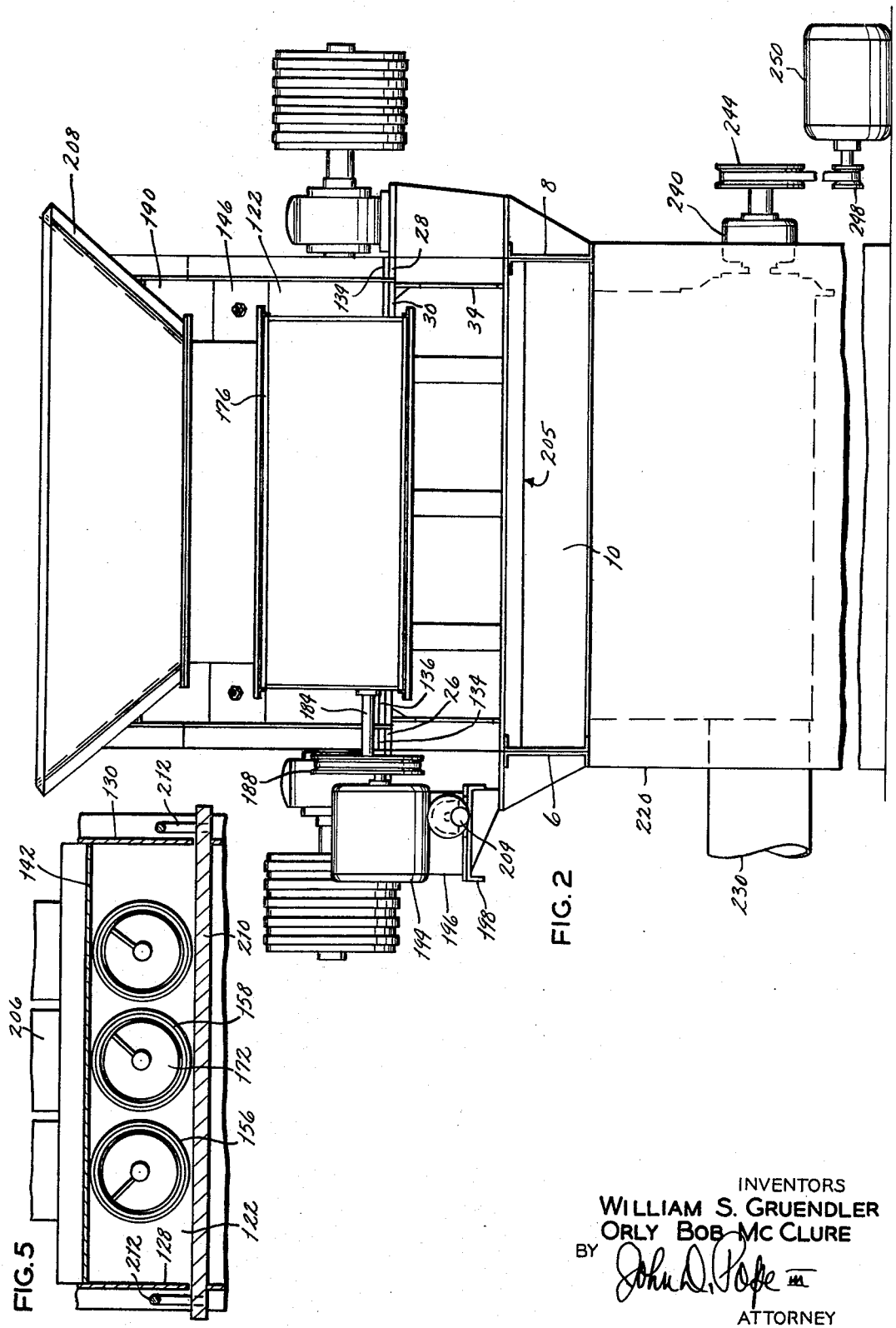
FIG. 2 is an end elevational view of the fluff mill.
Figure 3:
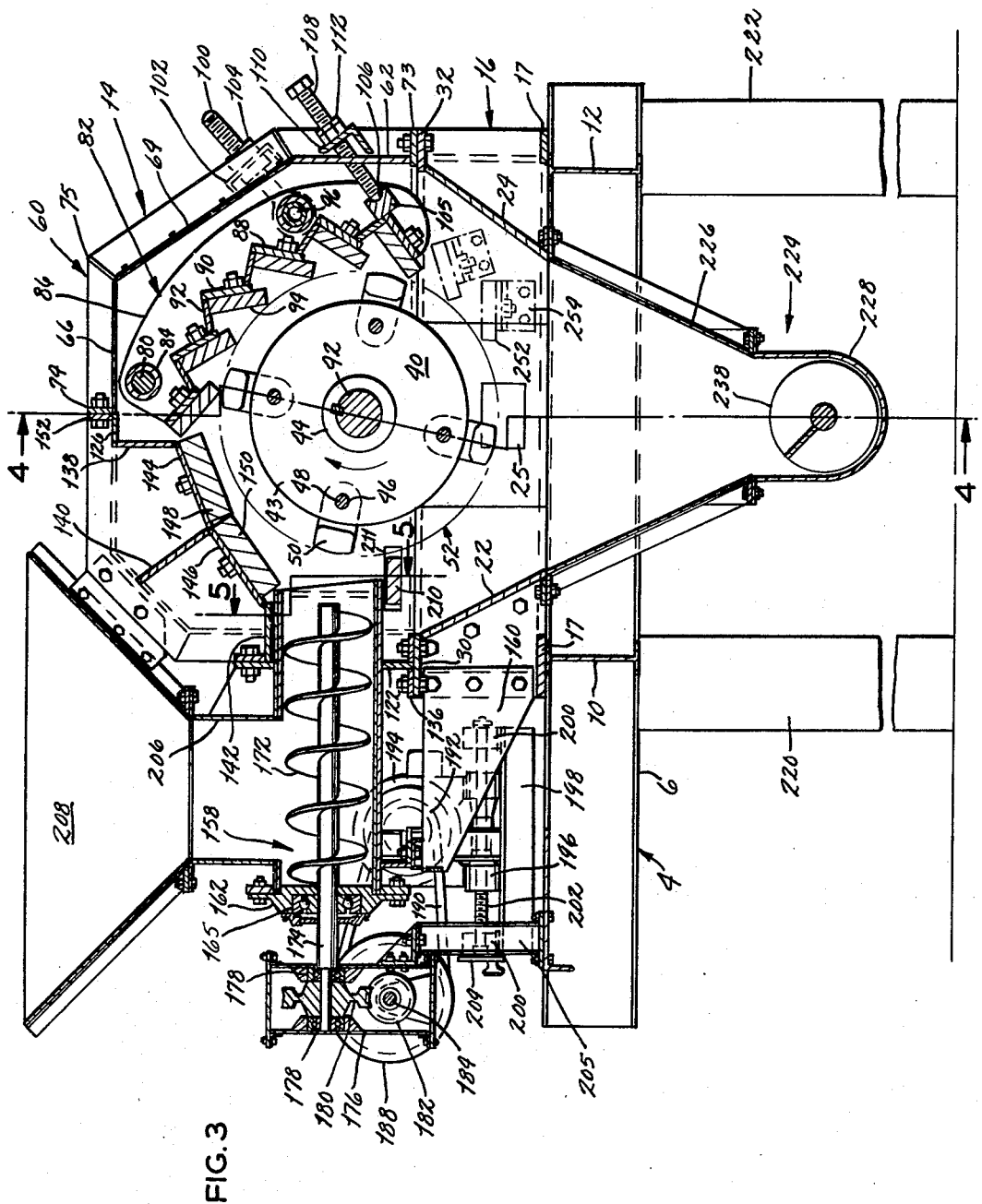
FIG. 3 is a sectional view taken along line 3—3 of FIG. 1.

FIGS. 4 and 5 are sectional views taken along lines 4—4 and 5—5, respectively, of FIG. 3.

Corresponding reference characters indicate corresponding parts throughout the several views of the drawings.

Referring now to the drawings, 2 designates a fluff mill including a rectilinear base frame 4 formed from a pair of longitudinally extending members 6, 8, which are interconnected by a pair of laterally extending members 10, 12, all of which are I-shaped in cross-sectional configuration. Rigidly mounted upon frame 4 is a cage 14 having a lower cage section 16 composed of a rectilinear frame plate 17 which overlies and is securely bolted to the upper flanges of members 6, 8, 10, 12. Welded to and projecting upwardly from frame plate 17 are upstanding lower side walls 18, 20, which are transversely connected by a pair of downwardly converging inclined end walls 22, 24. Side walls 18, 20, are provided with access doors 25 for gaining access to the interior of cage 14. Projecting laterally from and welded to the upper margins of side walls 18, 20, are side flanges 26, 28, which are transversely connected at their ends by end flanges 30, 32, the latter being welded to the upper margins of inclined end walls 22, 24. Side flanges 26, 28, are reinforced by a plurality of gussets 34 to provide subjacent support for pillow blocks 36, 38, which are bolted to the upper faces of flanges 26, 28, respectively. Carried by pillow blocks 36, 38, is a rotor 40.

Referring now to FIGS. 3 and 4, rotor 40 includes a rotor shaft 42 which is journaled near its ends within pillow blocks 36, 38. Intermediate side walls 18, 20, rotor shaft 42 is fitted with a plurality of rotor disks 43, each having a centrally disposed axially extending spacer collar 44 for maintaining disks 43 in correctly spaced relation to one another. Disks 43 are further provided with a plurality of circumferentially spaced axially aligned apertures 46 which accept hammer rods 48. Swingably mounted on hammer rods 48, intermediate disks 43, are swing hammers 50. As rotor 40 rotates, hammers 50 will swing outwardly by virtue of centrifugal force and the extremities thereof will describe a hammer-tip circle 52. Beyond pillow blocks 36, 38, rotor shaft 42 is fitted with multi-groove pulleys 53, at least one of which is connected to a suitable prime mover by means of conventional V-belting.

Enclosing the upper forward portion of rotor 40 and also forming part of cage 14 is a forward or breaker cage section 60 including a front wall 62, an inclined wall 64, and a forward top wall 66, all having coplanar side edges which are welded to a pair of spaced parallel forward side walls 68, 70. Along their bottom margins, side walls 68, 70, and front wall 62 are provided with outwardly projecting flanges 71, 72, 73, which rest upon and are rigidly bolted to side flanges 26, 28, and end flange 32, respectively, so as to maintain forward cage section 60 securely in place upon lower cage section 16. Similarly, along their rear margins, that is the left-hand margins as seen in FIG. 1, side walls 68, 70, and top wall 66 are provided with flanges 74, while side walls 68, 70, are cut away in the provision of semi-circular cutouts for accommodating rotor shaft 40. To impart rigidity to forward cage section 60 a plurality of grid-forming reinforcing ribs 75 are welded to and form part of top wall 66, inclined wall 64, and front wall 62.

Bolted to side walls 68, 70, in upwardly spaced relation from hammer-tip circle 52 are flange plates 76 having inwardly projecting coaxial bushings 78 which accept a transversely extending pivot rod 80 which, in turn, carries a breaker bar assembly 82. Breaker bar assembly 82 consists of a sleeve 84 rotatably mounted on rod 80 intermediate side walls 68, 70. Welded to sleeve 84 are a plurality of arcuate mounting plates 86, which along their inwardly presented margins are cut away in the formation of a plurality of V-shaped notches 88, each notch 88 having a leading edge which faces the hammers as they revolve in the direction indicated by the arrow in FIG. 3. Extending across the leading edges and welded to each of the mounting plates 86 are backing plates 90 and similarly extending across the receding or opposite edges of V-shaped notches 88 and likewise welded to mounting plates 86 are cross plates 92. Removably bolted against backing plates 90 are a plurality of hardened breaker bars 94 which, by virtue of the angular disposition of notches 88 as well as the arcuate contour of mounting plates 86, have their inwardly presented margins located along an arc substantially concentric with hammer-tip circle 52 (FIG. 3). Moreover, these inner margins are located in close proximity to hammer-tip circle 52 while the exposed faces of breaker bars 94 are angularly disposed to tangents to the hammer-tip circle 52 at the points of proximity. In other words, the exposed planar faces of breaker bars 94 face hammers 50 as rotor 40 revolves. Similarly, extending across the intermediate portion of arcuate mounting plates 86 and through arcuate slots located in forward side walls 68, 70, is a cross rod 96 which therebeyond is fitted with collars 98. Each collar 98 is attached to an adjusting bolt 100 which extends forwardly through a bracket 102 located on and projecting outwardly from breaker cage section 60. Each adjusting bolt 100, in turn, is fitted with lock nuts 104 for precisely adjusting the angular disposition of breaker bar assembly 82. In close proximity to its lower end, breaker bar assembly 82 is provided with a transversely extending cross bar 105 having a plurality of longitudinally spaced sockets 106 opening outwardly toward front wall 62. Sockets 106 accept the domed ends of back-up bolts 108 which extend through a reinforcing angle 110 and are held fast therein by means of lock nuts 112. By means of this construction the distance between hammer-tip circle 52 and breaker bars 94 can be precisely adjusted. To make such an adjustment, back-up bolts 108 are backed off slightly to free breaker bar assembly 82 for movement. Then nuts 104 are adjusted until the desired distance between hammer-tip circle 52 and breaker bars 94 is obtained, whereupon nuts 104 are tightened and back-up bolts 108 are screwed inwardly until their domed ends engage sockets 106, thereby holding breaker bar assembly 82 rigidly in place within cage 14.

Similarly mounted on lower cage section 16 is a rear cage section 120 having a rear wall 122, and a rear top wall 126, the coplanar end faces of which are welded to spaced parallel rear side walls 128, 130. At their lower margins side walls 128, 130, and rear wall 122 are provided with outwardly projecting flanges 132, 134, 136, respectively, which overlie and are securely bolted to side flanges 26, 28, and end flange 30, respectively, of lower cage section 16. Welded to and interconnecting side walls 128, 130, are support members 138, 140, 142, and welded to the inner ends thereof in outwardly spaced relation to hammer-tip circle 52 are backing plates 144, 146, to which hardened breaker plates 148, 150, respectively, are attached, preferably by means of bolts. Along their forward margins rear side walls 128, 130, and rear top wall 126 are provided with outwardly projecting flanges 152 which abut against flanges 74 of forward cage section 60, the flanges 74, 152, being held in tight facewise abutment by means of bolts. Like forward side walls 68, 70, of forward cage section 60 rear side walls 128, 130, are provided with semi-circular cutouts for accommodating rotor shaft 42.

Referring now to FIGS. 3 and 5, rear wall 122 of rear cage section 120 is provided with a plurality of laterally spaced circular apertures 156 through which tubular feed chutes 158 extend, each feed chute 158 inwardly terminating at an inclined margin located at its lower end in close proximity to hammer-tip circle 52 and at its upper end adjacent the rear margin of backing plate 146. Subjacent support for feed chutes 158 is provided by a plurality of gussets 160 which are bolted to side walls 18, 20, and project rearwardly therefrom. At their outer ends feed chutes 158 are fitted with circular end plates 162 which are apertured and suitably provided with conventional bearings 165. Rotatably mounted within feed chutes 158 are feed screws 172, each including a shaft 174 which extends through and is journaled in one of bearings 165. The outer ends of shafts 174 extend into a gear housing 176 where they are each journaled in bearings 178 and fitted with a worm wheel 180. Each worm wheel 180, in turn, engages a worm gear 182 carried on a drive shaft 184 which is also journaled within gear housing 176. One end of drive shaft 184 protrudes beyond the end of gear housing 176 where it is fitted with a pulley 188 around which a conventional V-belt 190 is trained. V-belt 190 also passes over a variable speed pulley 192 carried on the shaft of an electric motor 194 which is, in turn, carried by a mounting pedestal 196. Mounting pedestal 196 rests on a slideway 198 for slidable movement between two pillow blocks 200. Carried by pillow blocks 200 is a threaded shaft 202, which extends through and threadedly engages mounting pedestal 196. At its one end shaft 202 is fitted with a small crank handle 204. It is readily apparent that one can adjust the distance between pulleys 188, 192, merely by turning crank 204 and this, in turn, alters the tension in belt 190. As the tension in belt 190 changes, the effective diameter of pulley 192 is varied, thereby effecting a corresponding change in the angular velocity of drive shaft 184, and feed screws 172. Both gear housing 176 and slideway 198 are attached to longitudinally extending members 6, 8, of base frame 4 by a suitable supporting structure 205.

Intermediate their ends, feed chutes 158 are provided with upstanding intake stacks 206 all of which are, in turn, connected at their upper ends to the base of a common hopper 208 for containing a substantial supply of rock feed material.

Disposed within cage 14 immediately beneath the inner end of feed chutes 158 is an adjustable feed plate 210, the ends of which project through and are slidably mounted in rectangular apertures 211 formed in side walls 128, 130, of rear cage section 120. Beyond side walls 128, 130, feed plate 210 is provided with vertical bores which snugly accept the ends of L-shaped adjusting bolts 212, the opposite ends of which are threaded and extend through rigid outward projecting reinforcing ribs 214 which are welded or otherwise securely fastened to side walls 128, 130. The threaded ends of bolts 212 are fitted with lock nuts for maintaining feed plate 210 in a preselected position. By means of this construction, the location of feed plate 210 with respect to hammer-tip circle 52 can be precisely adjusted. In practice, feed plate 210 is advanced to a point where its leading margin is in close proximity to hammer-tip circle 52.

Referring now to FIGS. 1 and 3, fluff mill 2 is preferably emplaced upon a pair of upstanding concrete footings 220, 222, which are spaced sufficiently apart so that laterally extending members 10, 12, rest on and overlie the upper surfaces of such footings. Disposed within the pit or space intermediate footings 220, 222, is a dust collecting assembly 224 including a collecting hopper 226 which is bolted to the lower margins of side walls 18, 20, and converging end walls 22, 24, of lower cage section 16, forming a downwardly extending continuation thereof. Bolted to the bottom margin of collecting hopper 226 is a U-shaped collecting trough 228 which outwardly beyond one side of hopper 226 merges into a tubular discharge chute 230. At the other side of hopper 226, trough 228 is closed by an end plate 232 having a bearing 234 fitted therein which embraces the shaft 236 of an unloading screw 238. Screw 238 extends the full length of trough 228 and discharge chute 230. The outer end of shaft 236 carries a conventional shaft-mounted speed-reducer 240 which is stabilized by means of a torque arm and is further provided with a drive pulley 244 around which a V-belt 246 is trained. V-belt 246 also passes over a variable speed pulley 248 carried on the shaft of an electric motor 250.

As an optional feature it is possible to provide lower cage section 16 with additional, although rigidly mounted, breaker bars 252, which are held against upstanding side walls 18, 20, by means of brackets 254 (FIG. 3).

In operation, rock feed material is placed in hopper 208 and this material is picked up by feed screws 172 and carried into cage 14 through tubular feed chutes 158. The rate of feed is controlled or metered by turning crank 204 as previously noted. Feed screw 172 forces the rock across feed plate 210 and into the path of rapidly revolving hammers 50 which pick up the feed rock and hurl it against breaker plates 148, 150, and breaker bars 94. In effect, the rock material is continuously richocheted between breaker bars 94 and plates 148, 150, on one hand, and the whirling hammers 50, on the other, until it is reduced to a fine fluffy powder which falls into collecting hopper 226 and trough 228. In this connection, it is significant to note that the size of pulley 53 and the speed of the prime mover are such that the peripheral speed of hammers 50 is at least 16,000 ft./min., while adequate pulverization is achieved at peripheral speeds as high as 22,000 ft./min. Optimum pulverization is achieved when hammers 50 revolve at a peripheral speed of approximately 18,000 ft./min. Conventional hammermills, on the other hand, due to the inherent limitation associated with gravity feeding, and the so-called congested principle of operation, employ peripheral speeds no greater than 12,000 to 13,000 ft./min. Furthermore, as previously pointed out, breaker bars 94 are canted with respect to lines tangent to hammer-tip circle 52 at the points of proximity and consequently the rock particles are continuously bounced back into the path of whirling hammers 50. Notwithstanding the fact that breaker plates 148, 150, and breaker bars 94 extend no further than 180° around hammer-tip circle 52, by the time the rock feed material reaches the last breaker bar 94, it is reduced almost entirely to a finely divided powder-like substance, 50 percent of which will pass a 100 mesh screen. This substance is drawn off by unloading screw 238 through discharge chute 230 and in view of its extremely high percentage of fines, it commands a higher price on the market. It is important to note that fluff mill 2 contains no grate, screen, or other grid-like classifiers which are susceptible to clogging and rapid wear.

As hammers 50 and breaker bars 94 wear, the original clearance between the two can be restored merely by manipulating adjusting bolts 100 and backup bolts 108 as previously described. This amounts to a simple external adjustment which can be performed in a matter of minutes. Consequently, tear-down and maintenance time is reduced to a minimum. Most conventional hammermills, on the other hand, must be completely disassembled to replace hammers and grates when the clearance between the two becomes excessive. In this respect, it should be noted that reduction in fluff mill 2 is achieved to a large extent by impact, that is by the rock particles bouncing between breaker bars 94 and hammers 50, whereas conventional hammermills reduce the rock feed material by what might be appropriately described as a grinding action between the hammers and grates. Consequently, breaker bars 94 and breaker plates 148, 150, wear far less than conventional grates and breaker plates. When the inwardly presented edges of breaker bars 94 do finally wear out, the bars need not be replaced, for they can be turned around so that the former outer edge forms an inner edge adjacent hammer-tip circle 52.

Not only do adjusting bolts 100 and back-up bolts 108 compensate for wear, they can also be used to control the particle size of the end product. For example, by moving breaker assembly outwardly, it is possible to increase the number of larger particles in the end product which falls into collecting hopper 226.

Feed plate 210 prevents the rock feed material from falling into collecting hopper 226 and it too is adjusted externally. Accordingly, when hammers 50 wear, feed plate 210 is advanced slightly by manipulating the lock nuts engaging L-shaped adjusting bolts 212.

Since feed screws 172 force-feed the rock material into the path of hammers 50, this permits greater hammer velocities than could otherwise be achieved by conventional gravitational feeding. Moreover, by employing feed screws 172 together with the variable speed drive, it is possible to accurately meter the rock fed into cage 14 for pulverization. Furthermore, the combination of feed screws 172 and feed chute 150 together with unloading screw 238 and discharge chute 230 effectively seal the inlet and outlet of cage 14 and prevent the rock dust from escaping therefrom. Conventional hammermills, on the other hand, discharge considerable quantities of dust through their unsealed inlets and outlets as a result of the strong air currents generated by their revolving rotors. Consequently, fluff mill 2 is much cleaner in operation.

Inasmuch as fluff mill 2 employs a metered force feed, rotor 40 does not become congested or become loaded with rock material. As a result, large quantities of power are not needed to revolve rotor 40 at the high speeds necessary to achieve satisfactory operation. In this connection, it will be recalled that conventional hammermills employ a so-called congested principle of operation which involves loading up the arcuate spaces between the hammers with large quantities of rock which eventually is crushed between the hammers and breaker grid. It has been found that fluff mills constructed in accordance with the present disclosure consume less than one-third the energy required for conventional hammermills for reducing a given quantity of rock. Consequently, a less expensive motor of lower horsepower rating can be utilized.

The complete absence of grates, screens, or other classifying media eliminates the clogging problem associated with conventional hammermills. Therefore, owners of limestone quarries can operate fluff mill 2 during the entire year and particularly during the Winter months when the farm demand for crushed limestone is greatest.

In view of the above it will be seen that the several objects of the invention are achieved and other advantageous results attained.

As various changes could be made in the above constructions without departing from the scope of the invention, it is intended that all matter contained in the above descripion or shown in the accompanying drawings shall be interpreted as illustrative and not in a limiting sense.

What is claimed is:

1. A fluff mill comprising a cage; a rotor mounted in said cage; hammers carried by said rotor for rotation within said cage at a peripheral speed of at least approximately 16,000 feet per minute; feed means including a tubular feed chute extending into said cage and terminating in close proximity to the path described by said hammers; a screw rotatably mounted within said chute, and means for rotating said screw; a plurality of breaker bars disposed within said cage in outwardly spaced relation to the path described by said hammers, each of said breaker bars having one face presented at an angle with respect to a line tangent to said hammer path at the point of proximity; said breaker bars extending around said rotor in the direction of rotation for a limited arc whereby the feed material will be engaged by said hammers and hurled against said breaker bars to be crushed thereby; and an open portion in said hammer path intermediate said breaker bars and said feed means, said open portion being exposed to a collecting hopper so that crushed material can be withdrawn.

2. A fluff mill according to claim 1 wherein the portion of the hammer path which is exposed is presented downwardly so that the crushed material will precipitate.

3. A fluff mill according to claim 1 wherein breaker plates are positioned along said hammer path between said feed means and said breaker bars, said breaker plates and said breaker bars extending no further than 180° around said hammer path.

4. A fluff mill according to claim 1 wherein said breaker bars are mounted on a breaker bar assembly shiftably mounted within said cage, and adjusting means interconnect said breaker bar assembly and said cage so that said breaker bars can be advanced toward or retracted from the path described by said hammers.

5. A fluff mill according to claim 4 in which the breaker bar assembly is pivotally mounted in the cage and in which the adjusting means comprises an adjusting bolt pivotally connected to the breaker bar assembly in spaced relation to pivotal connection joining the cage and breaker bar assembly.

6. A fluff mill according to claim 5 and further characterized by holding means mounted on the cage in spaced relation to the pivotal juncture of the cage and breaker bar assembly, the holding means being adapted to engage the breaker bar assembly after the adjusting bolts have been set so as to reinforce it against outward movement away from the rotor.

7. A fluff mill according to claim 6 in which the adjusting means and holding means are operable externally of the cage.

8. A fluff mill according to claim 1 wherein the longitudinal axis of the feed chute is substantially horizontal and wherein the hammers move past the feed chute in an upwardly direction; the fluff mill being further characterized by a feed plate slidably mounted within the cage beneath the inner margin of the feed chute for movement to and from the rotor, and feed plate adjusting means interconnecting the cage and feed plate for adjusting the distance between the feed plate and the path described by the hammers.

9. A fluff mill according to claim 1 and further characterized by said collecting hopper being located beneath said rotor and attached to said cage, a trough at the bottom of said hopper; a tubular discharge chute extending outwardly beyond said hopper from said trough, the longitudinal axis of said trough and said discharge chute being coincident; an unloading screw rotatably mounted in said trough and discharge chute; and means for rotating said unloading screw so that the pulverized fluffy material can be withdrawn from said fluff mill.

10. A fluff mill comprising a cage; a rotor mounted in said cage; hammers carried by said rotor for rotation within said cage at a peripheral speed of at least approximately 16,000 feet per minute; an inlet at one side of said cage for introducing material to be pulverized into said cage at the side of the path of said hammers; feeder means for forcing the material into the path of said hammers through said inlet, a breaker bar assembly shiftably mounted within said cage and including a plurality of rigid breaker bars disposed along a limited arc located adjacent the path described by said hammers; said breaker bars facing said hammers so that said material will be hurled against said breaker bars and crushed; and adjusting means interconnecting said breaker bar assembly and cage so that said breaker bars can be advanced toward or retracted from the path described by said hammers.

11. A fluff mill according to claim 10, wherein the breaker bars have one of their exposed faces presented at an angle with respect to a line tangent to the hammer path at the point of proximity, the exposed angulated faces of the bars facing toward the direction of rotation so that the feed material will impact against such exposed faces.

12. A fluff mill according to claim 10 wherein the breaker bar assembly is pivotally mounted in the cage and wherein the fluff mill is further characterized by holding means for maintaining the breaker bar assembly rigid in a preselected position.

13. A fluff mill according to claim 12 wherein the adjusting means comprises at least one adjusting bolt pivotally connected to the breaker bar assembly in spaced relation to the pivotal connection joining the cage and breaker bar assembly; wherein the holding means comprises backup bolts mounted on the cage for axial movement toward and away from the breaker bar assembly, the backup bolts engaging the breaker bar assembly in spaced relation to the pivotal connection joining the cage and breaker bar assembly and in such a manner so as to prevent movement of the breaker bar assembly away from the path described by the hammers.

14. A fluff mill according to claim 10 wherein the hammers move past the inlet in an upwardly direction and wherein the fluff mill is further characterized by a feed plate slidably mounted within the cage beneath the innermost extremity of the inlet for movement to and from the rotor whereby to prevent the feed material from falling downwardly before being engaged by the hammers.

References Cited

UNITED STATES PATENTS

| | | | |
|---|---|---|---|
| 1,420,354 | 6/1922 | Williams | 241—189 |
| 1,711,464 | 4/1929 | Ruprecht | 241—186 |
| 2,287,799 | 6/1949 | Hartshorn | 241—186 |
| 2,970,532 | 2/1961 | Skelton | 241—186 X |

ROBERT C. RIORDON, Primary Examiner

M. G. RASKIN, Assistant Examiner